(12) United States Patent
Gong

(10) Patent No.: US 12,126,698 B2
(45) Date of Patent: Oct. 22, 2024

(54) DATA PROCESSING METHOD AND APPARATUS, AND COMPUTER-READABLE STORAGE MEDIUM

(71) Applicant: Tencent Cloud Computing (Beijing) Co., Ltd., Beijing (CN)

(72) Inventor: Jing Gong, Beijing (CN)

(73) Assignee: TENCENT CLOUD COMPUTING (BEIJING) CO., LTD., Beijing (CN)

( * ) Notice: Subject to any disclaimer, the term of this patent is extended or adjusted under 35 U.S.C. 154(b) by 0 days.

(21) Appl. No.: 18/314,094

(22) Filed: May 8, 2023

(65) Prior Publication Data
US 2023/0275976 A1 Aug. 31, 2023

Related U.S. Application Data

(63) Continuation of application No. PCT/CN2021/108504, filed on Jul. 26, 2021.

(30) Foreign Application Priority Data

Jun. 11, 2021 (CN) .......................... 202110656764.6

(51) Int. Cl.
*H04L 67/60* (2022.01)
(52) U.S. Cl.
CPC .................... *H04L 67/60* (2022.05)
(58) Field of Classification Search
None
See application file for complete search history.

(56) References Cited

U.S. PATENT DOCUMENTS 10,498,625 B1 * 12/2019 Mozealous ........... H04L 41/082
10,498,817 B1 * 12/2019 Morris .................. H04L 67/306
(Continued)

FOREIGN PATENT DOCUMENTS

CN 105100259 A 11/2015
CN 106990332 A 7/2017
(Continued)

OTHER PUBLICATIONS

The World Intellectual Property Organization (WIPO) International Search Report for PCT/CN2021/108504 Mar. 10, 2022 13 Pages (including translation).

*Primary Examiner* — Ranodhi Serrao
(74) *Attorney, Agent, or Firm* — ANOVA LAW GROUP, PLLC

(57) ABSTRACT

Embodiments of this application provide a data processing method, apparatus, and computer-readable storage medium. The method includes acquiring a data processing request of a target service, the request including data to be processed; invoking a first worker node of the first server to execute an operation corresponding to a first service process of the target service on the data to be processed to obtain an intermediate processing result, the first worker node being a worker node on the first server for processing the first service process; and transmitting the intermediate processing result to a second server according to a next service process in a plurality of service processes in the target service, so that the second server invokes a second worker node to execute an operation on the intermediate processing result, the second worker node being a worker node on the second server for processing the next service process.

18 Claims, 7 Drawing Sheets

(56) References Cited

U.S. PATENT DOCUMENTS

| | | | |
|---|---|---|---|
| 10,824,474 B1* | 11/2020 | Kamboj | G06F 9/5038 |
| 11,113,244 B1* | 9/2021 | Chen | G06F 16/1744 |
| 2016/0103708 A1* | 4/2016 | Mathew | G06F 9/5027 |
| | | | 718/101 |
| 2018/0060133 A1* | 3/2018 | Fang | G06F 9/5022 |
| 2018/0270164 A1 | 9/2018 | Ahmed et al. | |
| 2018/0314565 A1 | 11/2018 | Zhang et al. | |
| 2019/0147092 A1* | 5/2019 | Pal | H04L 67/125 |
| | | | 707/713 |
| 2020/0099606 A1* | 3/2020 | Mozealous | H04L 43/50 |

FOREIGN PATENT DOCUMENTS

| | | |
|---|---|---|
| CN | 110582750 A | 12/2019 |
| CN | 112000453 A | 11/2020 |

\* cited by examiner

DATA PROCESSING METHOD AND APPARATUS, AND COMPUTER-READABLE STORAGE MEDIUM

RELATED APPLICATIONS

This application is a continuation of PCT Application No. PCT/CN2021/108504, filed on Jul. 26, 2021, which in turn claims priority to Chinese Patent Application No. 202110656764.6, entitled "DATA PROCESSING METHOD AND APPARATUS, AND COMPUTER-READABLE STORAGE MEDIUM" and filed on Jun. 11, 2021. These two applications are incorporated herein by reference in their entirety.

FIELD OF THE TECHNOLOGY

This application relates to the field of computer technologies, and in particular, to a data processing method and apparatus, and a computer-readable storage medium.

BACKGROUND OF THE DISCLOSURE

A data stream processing process in a distributed parallel computing system of an Artificial Intelligence (AI) service is generally a computing-intensive processing process, which is difficult to understand and implement, and has strict requirements for developers. Currently, complex external control, management, and monitoring frameworks, such as spark and storm in the field of big data processing, are generally used for controlling the entire data stream computing process. For example, a complex management platform for data stream computing and processing may be built, a computing process is implemented for each service, the implemented tasks are hosted in the system, and the system records and monitors each process of data processing, and performs optimization according to the data processing results.

However, spark and storm both have relatively strict requirements for programming developers. Each service is a new data processing process, and requires customized development. The management platform for data stream computing and processing needs to spend a lot of resources and time on adjusting and optimizing system parameters, resulting in a limited data processing capacity and low efficiency. Because there are many component dependencies and environment dependencies, the scalability is poor. Therefore, how to enhance the scalability of the management platform for data stream computing and processing and meet the efficient processing for real-time data streams becomes an urgent problem to be solved.

SUMMARY

Embodiments of this application provide a data processing method, apparatus, and computer-readable storage medium. In this way, efficient processing of a real-time data stream can be realized, and service processes can be highly customized and highly scalable.

One aspect of this application provides a data processing method, and the method includes: acquiring a data processing request of a target service, the data processing request including data to be processed; invoking a first worker node of the first server to execute an operation corresponding to a first service process of the target service on the data to be processed to obtain an intermediate processing result, the first worker node being a worker node on the first server for processing the first service process; and transmitting the intermediate processing result to a second server of the plurality of servers according to a next service process in a plurality of service processes in the target service, so that the second server invokes a second worker node to execute an operation corresponding to the next service process on the intermediate processing result, the second worker node being a worker node on the second server for processing the next service process.

Another aspect of this application provides a server, including a processor, a network interface and a storage apparatus, the processor, the network interface and the storage apparatus being connected to each other, the network interface being controlled by the processor to transmit and receive data, the storage apparatus being configured to store a computer program, the computer program including program instructions, and the processor being configured to call the program instructions to perform the data processing method according to the first aspect.

Another aspect of this application provides a non-transitory computer-readable storage medium, storing a computer program, the computer program including program instructions, the program instructions being executable by a processor to perform the data processing method according to the first aspect.

In embodiments of this application, one or more worker nodes may run on each server, and each worker node is used for processing a service process of a target service. A first server acquires a data processing request of a target service, the data processing request carrying data to be processed. The first server may invoke a first worker node for processing a first service process of the target service to execute an operation corresponding to the first service process on the data to be processed to obtain an intermediate processing result. The first server transmits the intermediate processing result to a second server according to a next service process of the first service process, so that the second server invokes a second worker node for processing the next service process to execute an operation corresponding to the next service process on the intermediate processing result. Accordingly, service processes of the target service can be efficiently completed by invoking computing resources of the servers to obtain a final processing result, and the specific service processes of the service can be customized and are scalable.

DESCRIPTION OF EMBODIMENTS

Figure 1:
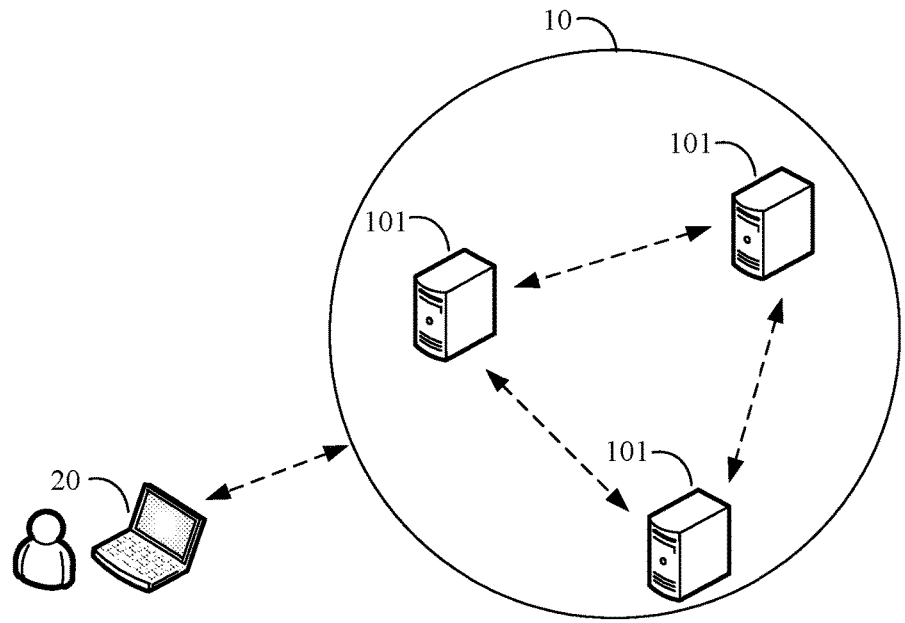
FIG. 1 is a schematic architectural diagram of a service processing system according to an embodiment of this application.

The technical solutions in the embodiments of this application are clearly described below with reference to the accompanying drawings. Apparently, the embodiments to be described are merely some rather than all of the embodiments of this application. All other embodiments obtained by a person of ordinary skill in the art based on the embodiments of this application without creative efforts shall fall within the protection scope of this application.

The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of cloud computing, and may form a resource pool, which is used as required, and is flexible and convenient. A background service of a network system requires a large amount of computing and storage resources, such as video websites, image websites, and more portal websites. As the Internet industry is highly developed, each article may have its own identifier in the future and needs to be transmitted to a background system for logical processing. Data at different levels is separately processed, and data in various industries requires strong system support, and needs to be implemented through cloud computing.

Cloud computing refers to a delivery and usage mode of IT infrastructure, and specifically refers to obtaining required resources through a network in an on-demand and easy-to-expand manner. Cloud computing in a broad sense is a delivery and usage mode of services, which is to obtain required services through a network in an on-demand and easy-to-expand manner. Such services may be related to the IT, software, and the Internet, or may be other services such as blockchain. Cloud computing is a product of development and integration of grid computing, distributed computing, parallel computing, utility computing, network storage, virtualization, load balancing and other traditional computer and network technologies.

Cloud computing grows rapidly with development of Internet, real-time data streaming, diversity of devices connected, and demands for searching services, social networks, mobile commerce, and open collaboration. Different from parallel distributed computing in the past, emergence of cloud computing will promote revolutionary changes in the entire Internet mode and enterprise management mode.

Big data refers to a collection of data that cannot be captured, managed, and processed by conventional software tools within a certain period of time, and is a massive, high-growth and diverse information asset that requires a new processing mode to have stronger decision-making power, insight discovery power, and process optimization capabilities. With the advent of the cloud era, big data has also attracted more and more attention, and big data requires special techniques to effectively process large amounts of data within a tolerable elapsed time. Technologies applicable to big data include massively parallel-processing databases, data mining, distributed file systems, distributed databases, cloud computing platforms, the Internet, and scalable storage systems.

Embodiments of this application mainly relate to cloud computing and big data technology in the field of cloud technology, and may be used for efficient processing of real-time signal streams (such as voice signals, video signals, etc.). The embodiments of this application are described in detail below.

FIG. 1 is a schematic architectural diagram of a service processing system according to an embodiment of this application. A service processing system 10 may be a distributed data processing system, and for example, may include one or more servers 101.

The one or more servers 101 in the service processing system 10 may exchange data with a terminal device 20. For example, the terminal device 20 may submit data to be processed to the service processing system 10. The data to be processed may be streaming signal data dynamically generated in real time, such as voice streaming data, video streaming data, etc. The service processing system 10 may perform data processing on the data to be processed to implement a related service, for example, may perform a speech recognition service on voice streaming data or an image recognition (e.g., face recognition) service on video streaming data.

The process of data processing may be related to the service. For example, the speech recognition service may include three service processes: Automatic Speech Recognition (ASR), Natural Language Processing (NLP) and Text-To-Speech (TTS).

For example, each server 101 may have one or more worker nodes (defined as workers or jobs) running thereon. Each worker is an abstract description of an actual service operation of a single function, and is used for processing a process in a service. For example, the speech recognition service includes three service processes ASR, NLP and TTS, and each service process in the three service processes ASR, NLP and TTS may be abstracted into one type of worker, for example, an ASR worker, an NLP worker and a TTS worker. The ASR worker is a worker responsible for processing the ASR service process, the NLP worker is a worker responsible for processing the NLP service process, and the TTS worker is a worker responsible for processing the TTS service process.

Figure 2:
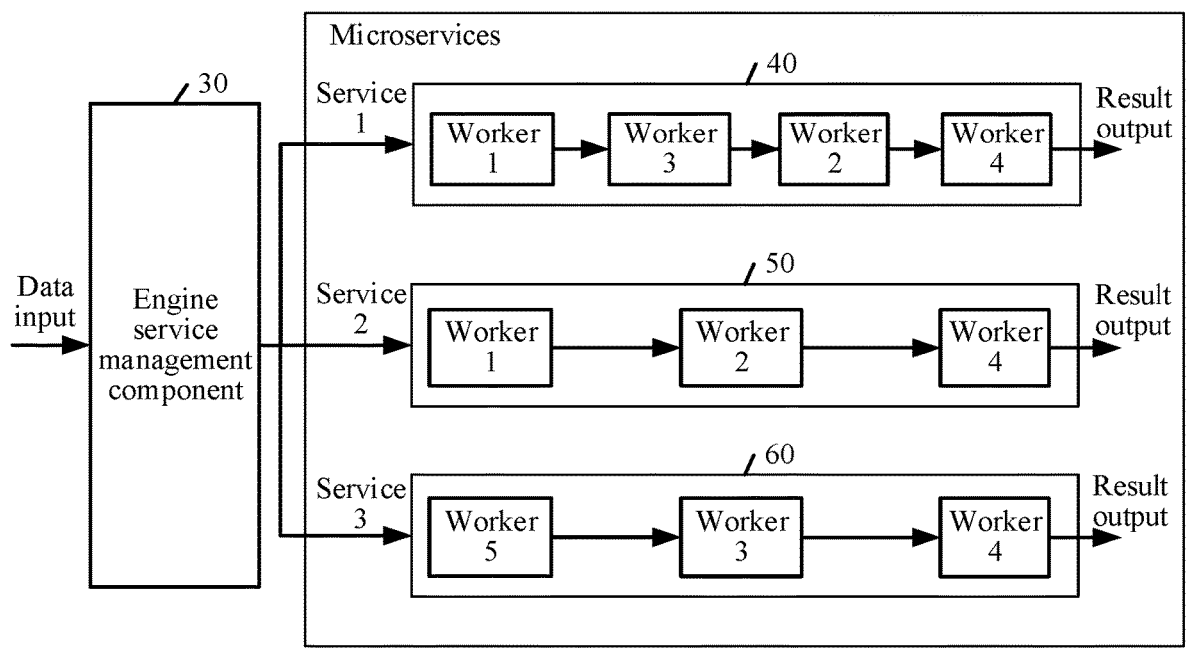
FIG. 2 is a schematic diagram of an overall design framework of a system according to an embodiment of this application.

FIG. 2 shows an overall design framework of a system according to an embodiment of this application. The system mainly includes: an engine service management component 30 (which may be defined as a Muduo+ Server), and a service process processing pipeline configured for each service. A service 1, a service 2, and a service 3 in FIG. 2 may be considered as different services. A service process of each service may be a free combination of different workers. In other words, different services correspond to different worker groups. For example, the service 1 is processed by workers included in a worker group 40, the service 2 is processed by workers included in a worker group 50, and the service 3 is processed by workers included in a worker group 60. It can be seen that the workers in the same group jointly implement the corresponding service. The order, type, and quantity of workers may be flexibly customized. For example, processing of the service 2 is completed by the worker group 50 including three workers: a worker 1, a worker 2 and a worker 4, and the execution order is worker 1→worker 2→worker 4. The worker 1, the worker 2 and the worker 4 may be workers of the same type, that is, implement the same service process. Certainly, the worker 1, the worker 2 and the worker 4 may also be of different types, that is, each implement a different service process. A location where each worker runs may be flexibly allocated. For example, workers for implementing a service are configured on the same server 101 or on different servers 101. This is not limited in the embodiments of this application.

Taking the configuration on different servers 101 as an example, assuming that the service 2 is a speech recognition service, and the worker 1, the worker 2 and the worker 4 in the processing process are an ASR worker, an NLP worker and a TTS worker respectively, the worker 1, the worker 2, and the worker 4 may be configured on different servers 101, to be specific, one server 101 is responsible for processing one of the service processes of the speech recognition service. According to the processing order of the service process of the speech recognition service, after performing ASR processing on data, the server where the worker 1 is located transmits a first processing result to the server where the worker 2 is located; the server where the worker 2 is located performs NLP processing on the received first processing result, and after the processing is completed, transmits a second processing result to the server where the worker 4 is located; and the server where the worker 4 is located performs TTS processing on the received second processing result, and after the processing is completed, obtains a final result of the speech recognition service.

Certainly, the service 1, service 2, and service 3 may also correspond to the same service. In other words, the same service has a plurality of working modes. The service 1, the service 2 and the service 3 each represent one working mode. The process of processing the service varies with different working modes. Switching may be performed freely between different working modes according to user requirements.

The server 101 may be a cloud server for providing basic cloud computing services such as a cloud service, a cloud database, cloud computing, a cloud function, cloud storage, a network service, cloud communication, a middleware service, a domain name service, a security service, a CDN, and a big data and artificial intelligence platform. The terminal device 20 may be a smartphone, a tablet computer, a notebook computer, a desktop computer, a smart speaker, a smart watch, an in-vehicle smart terminal and the like, but is not limited thereto. The terminal device 20 and the server 101 may be directly or indirectly connected through wired or wireless communication, which is not limited in this application.

It can be seen that an actual service operation of a single function may be abstractly described as a worker node (worker) through the service processing system and the overall design framework of the system provided in the embodiments of this application. One or more workers configured on the same server may be of the same type or of different types. In addition, provided that service logic is satisfied, the number of workers required by a service and the execution order of the workers may be freely designed, so that the worker nodes (workers) for processing the service processes of the service may be flexibly configured on the server(s). In addition, workers may be freely combined, so that specific service processes can be highly customized, thereby facilitating the adaption of the system to new service scenarios and achieving high scalability.

Figure 3:
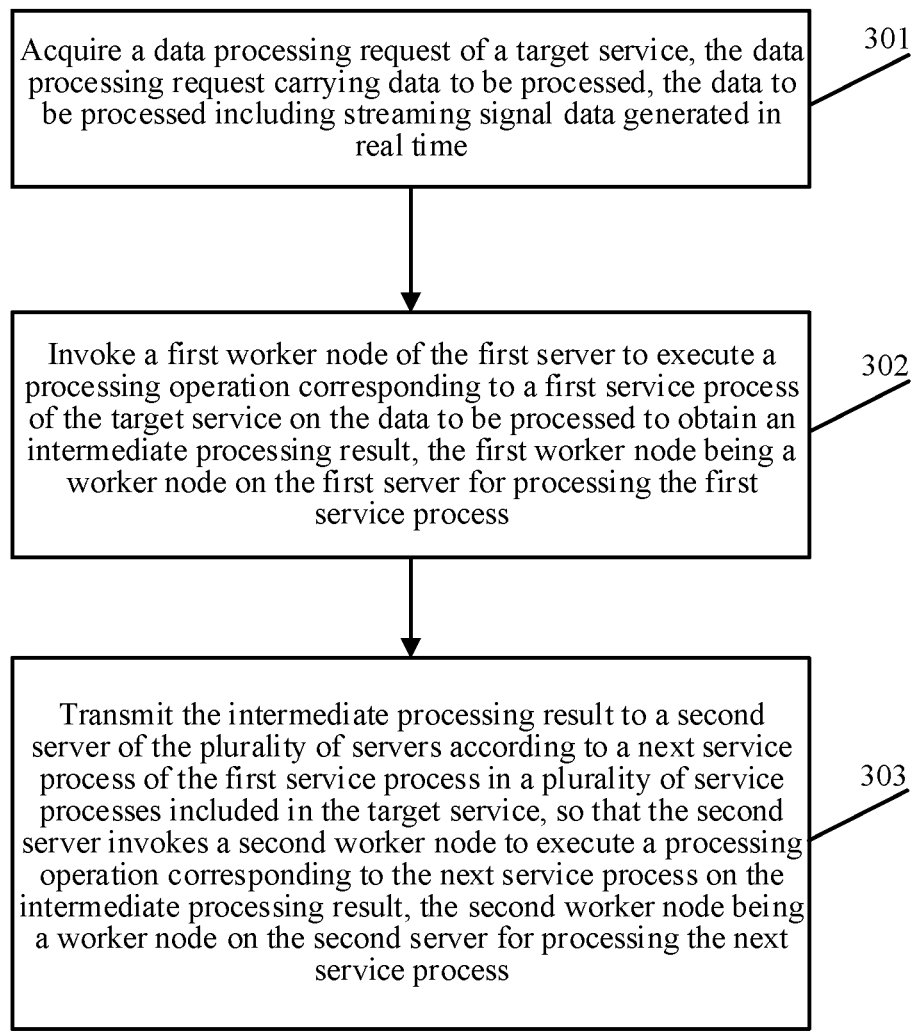
FIG. 3 is a schematic flowchart of a data processing method according to an embodiment of this application.

FIG. 3 is a schematic flowchart of a data processing method provided based on the service processing system shown in FIG. 1 according to an embodiment of this application. The service processing system includes a plurality of servers. The data processing method may be applied to the first server of the plurality of servers. The method includes the following steps.

301. Acquire a data processing request of a target service, the data processing request carrying data to be processed, the data to be processed including streaming signal data generated in real time.

For example, the first server may receive the data processing request of the target service transmitted by a terminal device or the data processing request of the target service transmitted by another server. The first server is any one of the plurality of servers included in the service processing system.

302. Invoke a first worker node of the first server to execute a processing operation corresponding to a first service process of the target service on the data to be processed to obtain an intermediate processing result, the first worker node being a worker node on the first server for processing the first service process.

The first server has one or more worker nodes (i.e., the above-mentioned workers) running thereon, and each worker node is used for processing a service process of the target service.

In one embodiment, after acquiring the data processing request of the target service, the first server may acquire the data to be processed carried in the data processing request. The data to be processed may be data to be processed in the first service process of the target service. The first service process is a service process currently to be executed in a plurality of service processes included in the target service. If the first service process is an initial service process of the target service, the data to be processed may be data to be processed uploaded by the terminal device in real time, for example streaming signal data dynamically generated in real time, including voice streaming data or video streaming data uploaded by the terminal device in real time, etc. If the first service process is not the initial service process of the target service, the data to be processed may be an intermediate processing result obtained by data processing performed in a previous service process of the first service process. The first server determines a worker node for processing the first service process of the target service (defined as a first worker node) from one or more worker nodes running thereon, and then, invokes the first worker node to perform the processing operation corresponding to the first service process on the data to be processed, to obtain the intermediate processing result corresponding to the first service process.

In some embodiments, the target service may include a speech recognition service, and a service process of the speech recognition service may include one or more of automatic speech recognition (ASR), natural language processing (NLP), and text-to-speech (TTS).

In some embodiments, the first worker node has a thread pool running thereon, the thread pool includes a plurality of work threads, and the first server may invoke the plurality of work threads on the first worker node to perform the processing operation corresponding to the first service process of the target service on the data to be processed in parallel, to obtain the intermediate processing result. The intermediate processing result is a result obtained after the data is processed by the current service process, and is passed to a next service process as input data for further processing. If the current service process is a last service process, the intermediate processing result is a final processing result of the service. For example, the target service is a speech recognition service, including three service processes: automatic speech recognition (ASR), natural language processing (NLP), and text-to-speech (TTS), the execution order is ASR→NLP→TTS, the first service process is ASR, and the thread pool running on the first worker node includes three work threads 1, 2 and 3. In this case, the work threads 1, 2 and 3 of the first worker node may respectively perform speech recognition processing on different parts of the data to be processed. Assuming that the data to be processed is speech data with a length of 300 ms, the 300 ms speech data may be divided into three parts, each part having 100 ms speech data, and the worker threads 1, 2 and 3 may respectively perform speech recognition processing on the 100 ms speech data parts concurrently to obtain respective recognition results. The respective recognition results are combined and used as a processing result corresponding to the speech recognition process (i.e., the intermediate processing result), and the intermediate processing result is transmitted as input data to the worker nodes corresponding to the next service process (i.e., natural language processing (NLP)) for data processing. By introducing the thread pool inside the worker, computing and communication can be implemented in parallel in concurrent scenarios, and computing resources can be fully used, to improve the effective utilization rate of resources. The implementation of computing and communication in parallel ensures high service processing efficiency of the system.

303. Transmit the intermediate processing result to a second server of the plurality of servers according to a next service process of the first service process in a plurality of service processes included in the target service, so that the second server invokes a second worker node to execute a processing operation corresponding to the next service process on the intermediate processing result, the second worker node being a worker node on the second server for processing the next service process.

In one embodiment, the first server may acquire the next service process of the first service process, and transmit the intermediate processing result to the second server of the plurality of servers according to the next service process, so that the second server invokes the second worker node for processing the next service process to process the intermediate processing result. Each server performs data processing and transmission of the processing result in the same manner, so that all the service processes of the target service may be efficiently implemented to obtain the final processing result. After receiving the intermediate processing result corresponding to the first service process transmitted by the first server, the second server may determine a worker node type according to the next service process of the first service process, determine the second worker node matching the worker node type from one or more worker nodes running thereon, and then invoke the second worker node to perform a corresponding processing operation on the intermediate processing result. For example, if the first service process is ASR and the next service process of the first service process is NLP, the second server, after receiving the intermediate processing result corresponding to ASR, finds the second worker node running thereon for processing the NLP service process, and uses the second worker node to perform NLP processing on the intermediate processing result.

In some embodiments, after obtaining the intermediate processing result, the first server may first determine whether the first service process is the last service process of the target service; if the first service process is not the last service process, transmit the intermediate processing result to the second server; and if the first service process is the last service process, skip transmitting the intermediate processing result to the second server, and determine the intermediate processing result as the final processing result.

In some embodiments of this application, one or more worker nodes may run on each server, and each worker node is used for processing a service process of a target service. After acquiring the data processing request of the target service, the first server may acquire the data to be processed carried in the data processing request, and invoke the first worker node for processing the first service process of the target service to process the data to be processed, to obtain the intermediate processing result. Then, the first server transmits the intermediate processing result to the second server according to the next service process of the first service process, so that the second server invokes the second worker node for processing the next service process to process the intermediate processing result. In this way, service processes of the target service can be efficiently completed by invoking computing resources of the servers to obtain a processing result, and the specific service processes of the service can be highly customized and are highly scalable.

Figure 4:
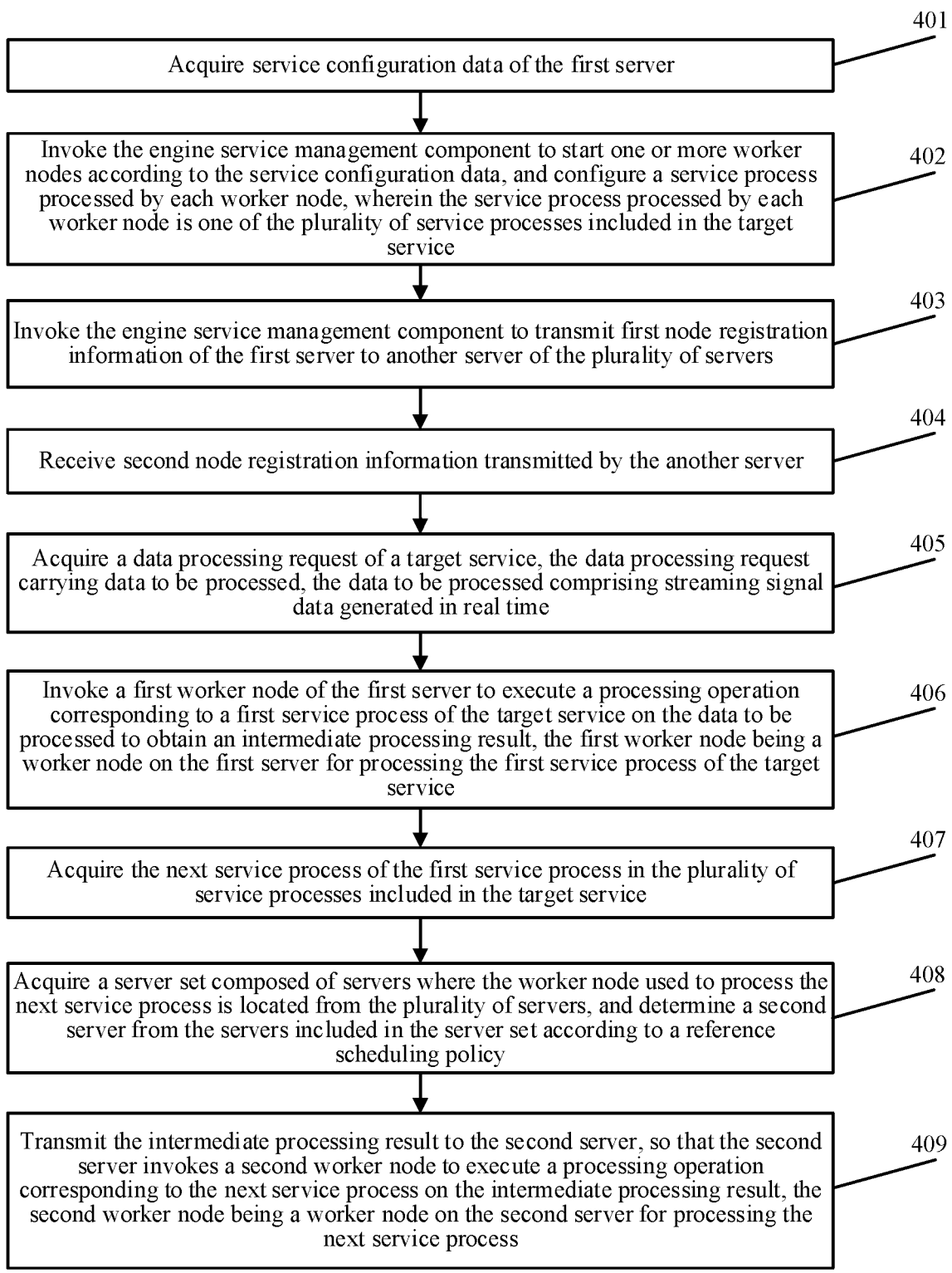
FIG. 4 is a schematic flowchart of another data processing method according to an embodiment of this application.

FIG. 4 is a schematic flowchart of another data processing method provided based on the service processing system shown in FIG. 1 according to an embodiment of this application. The data processing method may be applied to a server. The method includes the following steps.

401. Acquire service configuration data of the first server.

Each server further has an engine service management component (or referred to as an engine framework main program) running thereon.

For example, the user may freely customize the service processes of the target service, and flexibly distribute worker nodes for processing the service processes. For example, the worker nodes are centrally deployed on one server or are distributed on multiple servers. The first server may acquire the service configuration data of the first server. The service configuration data may be used to configure a number of worker nodes started on the first server and the service process corresponding to each worker node.

402. Invoke the engine service management component to start one or more worker nodes according to the service configuration data, and configure a service process processed by each worker node, wherein the service process processed by each worker node is one of the plurality of service processes included in the target service.

In one embodiment, the first server may start the engine service management component and invoke the engine service management component to parse the service configuration data to determine key data such as the number of started worker nodes and the service process corresponding to each worker node, start a corresponding number of one or more worker nodes according to the key data, and configure the service process processed by each worker node.

A template file for configuring a function of a worker node (i.e., a corresponding service process processed by the worker node) may be provided to the user. The user adds developed program code having the data processing function of the corresponding service process to the template file, and carries the template file with the added program code in the service configuration data. In this way, the first server starts and configures worker nodes with corresponding service process processing capabilities by invoking the engine service management component according to the program code added in the template file. Each worker node realizes the corresponding service processing capability by running the program code corresponding to the corresponding service process carried in the template file. For the speech recognition service, the user may respectively develop three types of program code with automatic speech recognition (ASR), natural language processing (NLP), and text-to-speech (TTS) processing capabilities, add the different types of program code to the template file, and distribute the template file to corresponding servers as configuration data. Each server starts and configures worker nodes with corresponding service process processing capabilities by invoking the engine service management component according to the program code added in the template file. In an example where workers of different types for implementing the speech recognition service are configured on different servers, a server 1 may start the worker node of the ASR type according to the program code with the automatic speech recognition ASR processing capability, the server 2 may start the worker node of the NLP type according to the program code with the natural language processing NLP processing capability, and the server 3 may start the worker node of the TTS type according to the program code with the text-to-speech (TTS) processing capability, to realize the distributed configuration of different types of worker nodes.

In some embodiments, after the worker node configuration on the first server is completed, if the user wants to make a modification, the first server may acquire service update data, invoke the engine service management component to parse the service update data, and perform an adjustment operation on the worker nodes on the first server according to a result of the parsing. For example, the adjustment operation includes one or more of the service processes of adding a worker node, deleting a worker node and adjusting a service process processed by the worker node. It can be seen that the user is allowed to flexibly adjust the number and functions of worker nodes to improve universality.

In some embodiments, the number of worker nodes on the server may be automatically horizontally scaled if there are too many concurrent data processing requests for the target service within a short period of time. For example, if the number of data processing requests acquired within a reference time reaches a number threshold, the engine service management component may be invoked to start at least one new worker node (defined as third worker node) according to the previously acquired service configuration data, and configure a service process processed by each third worker node. For example, the reference time is 1 second and the number threshold may be 10. Certainly, the reference time and the number threshold may have other values. For example, if a worker node of the ASR type runs on a server, service configuration data related to the ASR type obtained in the configuration stage may be automatically acquired, and at least one worker node of the ASR type may be started according to the service configuration data. In this way, worker nodes may be dynamically expanded through the automatic worker node expansion to meet real-time service data processing requirements.

In some embodiments, if there is an idle worker node or there are a large number of idle worker nodes, the number of worker nodes on the server may be automatically reduced, for example, by shutting down such worker nodes. For example, if an idle time of a worker node is long, for example, if the idle time reaches a time threshold which may be 1 minute and certainly may also have other values, the worker node may be shut down. Alternatively, if the number of idle worker nodes among worker nodes of the same type reaches a preset ratio which may be, for example, 50% and certainly may also have other values, there are a total of five worker nodes of the ASR type on the server, and three worker nodes of the ASR type are in an idle state, the number of idle worker nodes among the worker nodes of the ASR type accounts for 60%, which exceeds 50%, all or part of the idle three worker nodes may be shut down. In this way, unnecessary occupation of software and hardware resources of the server may be saved by automatically compressing the worker nodes, to ensure the resource allocation of the worker nodes in the working state and reduce power consumption.

In some embodiments, the service configuration data may also carry configuration data of a thread pool of each worker node. Characteristic data of the thread pool of each worker node may be determined according to the service configuration data. The characteristic data includes a number of work threads and an amount of resources occupied. The corresponding thread pool is started on each worker node according to the characteristic data of the thread pool of each worker node by invoking the engine service management component. The thread pool may include one or more work threads. The work threads included in the thread pool are used for processing corresponding service processes. This helps optimize the performance of the system and can make full use of computing capabilities of hardware resources such as a CPU of the server according to a running environment.

Figure 5:
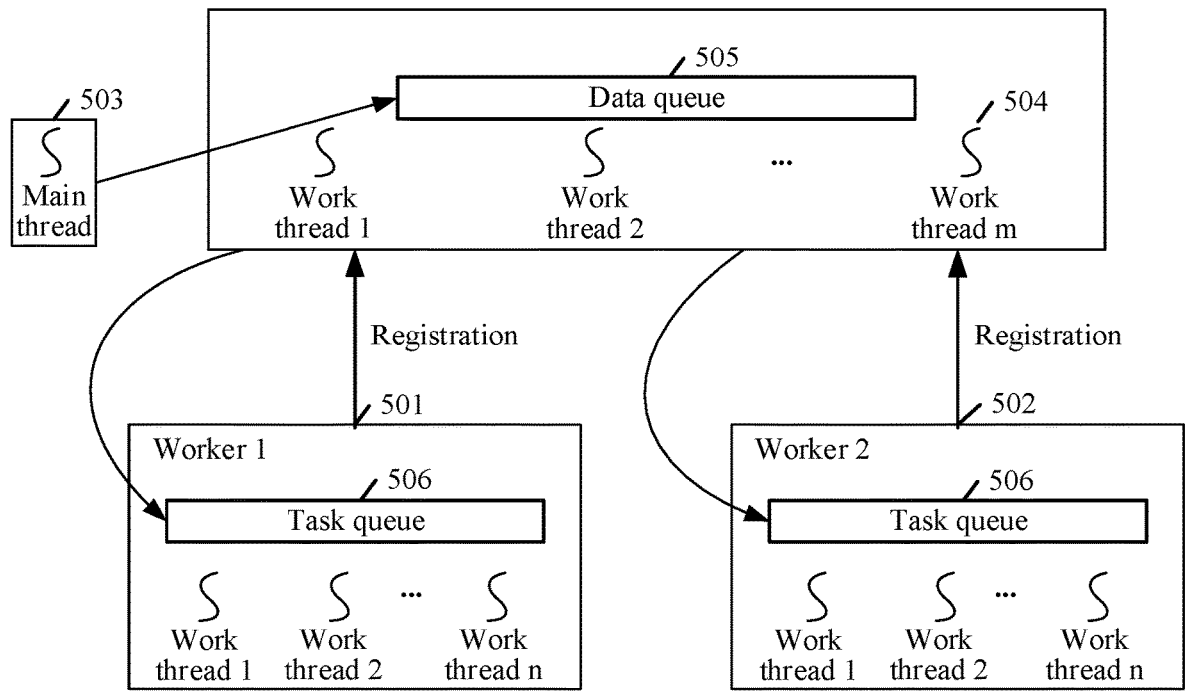
FIG. 5 is a schematic diagram of an overall process for service processing according to an embodiment of this application.

In some embodiments, as shown in FIG. 5, a service process of a service is processed by worker node 1 (i.e., worker 1) 501 and worker node 2 (i.e., worker 2) 502, worker 1 and worker 2 may first perform service registration after being started. Data may be queued in a request queue data and wait for processing. The thread pools inside worker 1 and worker 2 each include a main thread 503 and a plurality of work threads 504 (i.e., thread 1, thread 2, . . . , thread n). Each worker adds data in a data queue 505 to its own task queue 506, and uses the work threads 504 to process the data in the task queue 506 in parallel.

403. Invoke the engine service management component to transmit first node registration information of the first server to another server of the plurality of servers.

404. Receive second node registration information transmitted by the another server.

For example, each server further has a service registry (for example, zookeeper) running thereon. When being started, each worker node needs to register with the service registry. For the first server, registration data of each worker node on the first server may be acquired by invoking the service registry. The registration data includes a service process processed by each worker node and a node identifier. Node registration information of the first server (defined as first node registration information) is generated according to the registration data of each worker node. The node registration information is used for indicating the number of worker nodes started on the first server and the corresponding service process processed by each worker node. The first server may invoke the engine service management component to transmit the first node registration information to the another server.

Figure 6:
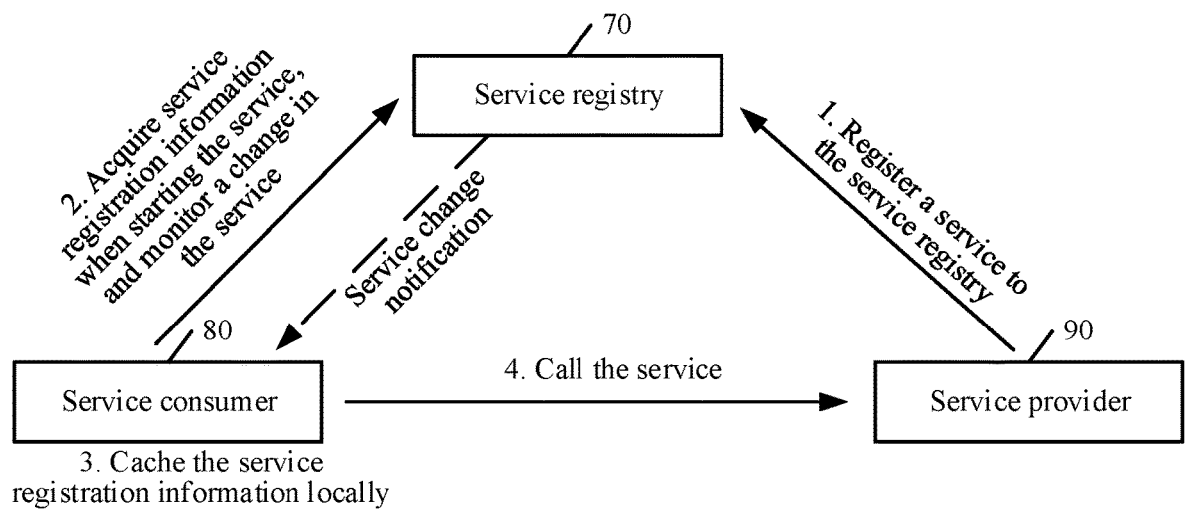
FIG. 6 is a schematic diagram of service registration implemented by worker nodes according to an embodiment of this application.

In some embodiments, an implementation of service registration performed by worker nodes may be shown in FIG. 6. Registration and dynamic discovery of worker nodes are performed by zookeeper, where the zookeeper exists as a service registry 70. Each service provider 90 (i.e., worker node (worker)) registers a service to the zookeeper and periodically reports heartbeat information to the service registry to prove that the service provider is alive. For example, in the speech recognition service, asr worker is registered in a path /iworker/asr, and a tts worker is registered in a path /iworker/tts. A service consumer 80, i.e., an engine service management component, acquires service registration information when being started, and subscribes to changes of data and worker nodes under a zk path. Once a service provider (i.e., worker) changes, the zookeeper informs the service consumer (engine service management component), and the service consumer updates locally cached downstream service address information, to obtain a network address (e.g., an IP address) of a server where the changed worker is located.

The first node registration information includes a service process processed by each worker node, a node identifier, and a network address of the first server.

Correspondingly, the first server also receives node registration information transmitted by the another server (defined as second node registration information) by invoking the engine service management component. The second node registration information includes a service process processed by each worker node on the another server, a node identifier, and a network address of the another server. By service registration and registration information sharing, the engine service management component can accurately and comprehensively learn about the distribution of worker nodes and capabilities of the worker nodes (i.e., corresponding service processes processed by the worker nodes).

405. Acquire a data processing request of a target service, the data processing request carrying data to be processed, the data to be processed including streaming signal data generated in real time.

406. Invoke a first worker node of the first server to execute a processing operation corresponding to a first service process of the target service on the data to be processed to obtain an intermediate processing result, the first worker node being a worker node on the first server for processing the first service process of the target service.

For implementations of steps 405 to 406, reference may be made to the related description of steps 201 to 202 in the foregoing embodiments, and the details will not be described herein again.

Figure 7:
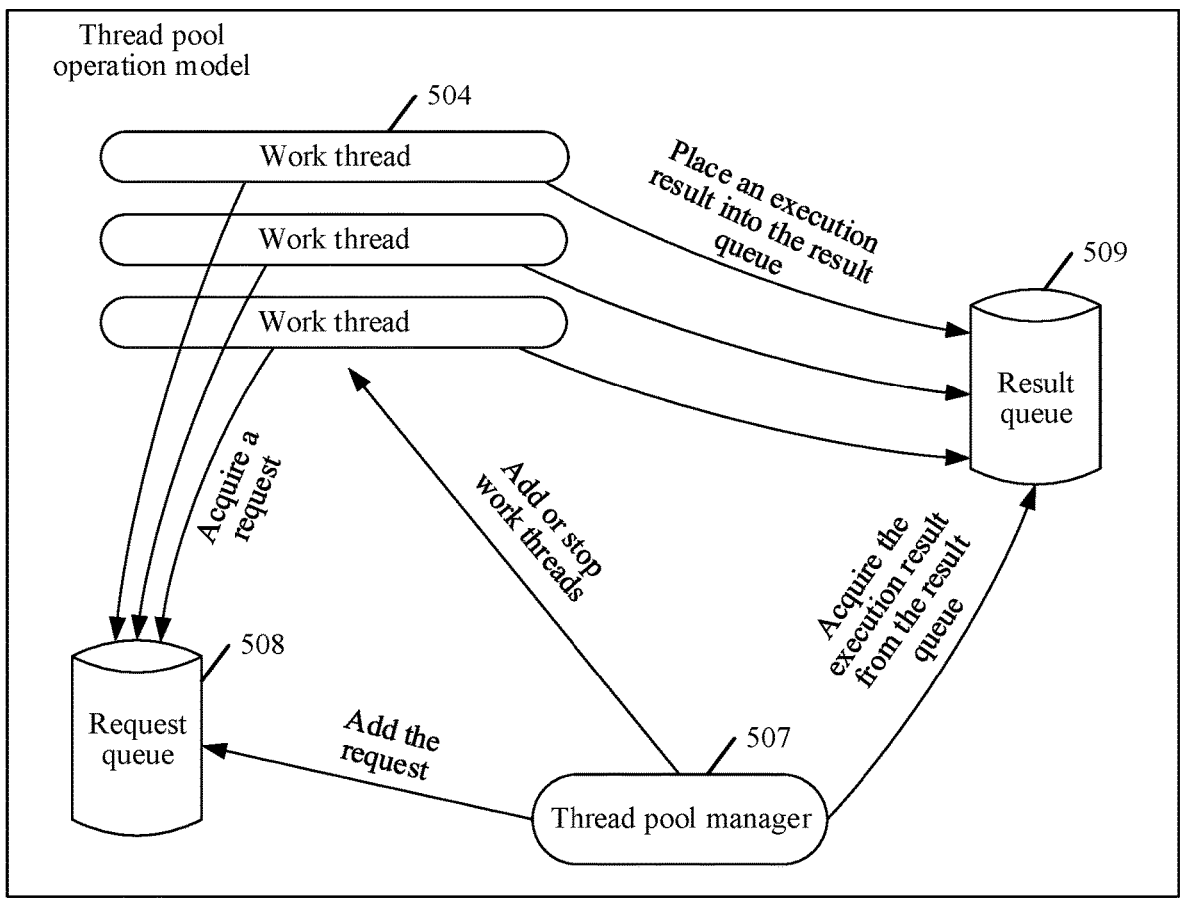
FIG. 7 is a schematic diagram of a data processing process inside a worker node according to an embodiment of this application.

In some embodiments, as shown in FIG. 7, an internal implementation of invoking the first worker node to process the data to be processed may include the following steps. The engine service management component may invoke a thread pool manager 507 of each worker in sequence, so that the thread pool manager 507 adds a request to a request queue 508. A work thread 504 in the thread pool reads the request queue 508 in a first-in, first-out order for processing. After processing, a result is placed in a result queue 509. The thread pool manager 507 may acquire the data processing result of the first service process from the result queue 509.

In some embodiments, each service (e.g., target service) may include one or more working modes, and each working mode includes a plurality of corresponding service processes and an execution order of the plurality of service processes.

In some embodiments, during service processing performed by a server, a user can freely switch between working modes, so that the server performs data processing according to a service processing processes corresponding to the working mode switched to. For example, the first server acquires a mode switching instruction of the target service, the mode switching instruction carrying a target working mode that the user expects to switch to. For example, the first server receives a mode switching instruction input by a user and transmitted by a terminal device. The first server switches a current working mode of the target service to the target working mode, and acquire a plurality of service processes included in the target working mode and an execution order of the plurality of service processes. When receiving a data processing request of the target service, the first server performs data processing according to the service processes included in the target working mode and the execution order. In this way, rapid switching of the working mode is realized, thereby meeting personalized requirements of users for different data processing processes of the same service.

In some embodiments, data transmitted (including the above-mentioned data processing request, mode switching instruction, etc.) may be structured data obtained by data encapsulation, for example, data obtained by json format encapsulation. Two data types may be defined: service data and control data. Examples of structured data may be as follows:

Message json string
{
   "message_type": //Distinguish service data from control data
   "uid_type": //Service type, such as ASR/NLP/TTS, etc.
   "src worker id": ///Source worker id
   "dest worker id": //Target worker id
   "payload": //Actual data content
}

For example, the first server may distinguish, according to a type identifier (e.g., message_type) in the structured data, whether the acquired data is a data processing request or a mode switching instruction. If the data type indicated by the type identifier is service data, it may be determined that the acquired data is a data processing request. If the data type indicated by the type identifier is control data, it may be determined that the acquired data is a mode switching instruction. In this way, different data types can be accurately and effectively indicated by the type identifier in the structured data, making it convenient for the server to distinguish data.

407. Acquire the next service process of the first service process in the plurality of service processes included in the target service.

For example, the first server may acquire the current working mode of the target service, acquire a plurality of service processes included in the current working mode and an execution order of the plurality of service processes, and acquire the next service process of the first service process according to the plurality of service processes included in the current working mode and the execution order of the plurality of service processes. For example, the service process included in the target service and the execution order are ASR→NLP→TTS. If the first service process is NLP, the next service process is TTS.

In some feasible embodiments, the user may be allowed to flexibly configure the working mode of each service. For example, for any service (e.g., target service), working mode configuration data of the target service may be acquired, and one or more working modes of the target service are generated according to the working mode configuration data, each working mode including a plurality of corresponding service processes and an execution order of the plurality of service processes. For example, the target service is the speech recognition service, and two working modes may be configured, where one working mode is ASR→NLP→TTS, and the other working mode is ASR→NLP.

408. Acquire a server set composed of servers where the worker node used to process the next service process is located from the plurality of servers, and determine a second server from the servers included in the server set according to a reference scheduling policy.

For example, the first server may determine the server set composed of servers where the worker node used to process the next service process is located according to the node registration information of each server, determine the second server from the servers included in the server set according to the reference scheduling policy, and transmit the intermediate processing result to the second server.

In some embodiments, a reference scheduling policy may be that: the first server may determine a server identifier according to a signature of the data to be processed and a number of servers included in the server set. For example, the signature of the data to be processed is converted to an integer value int, and then a modulo operation is performed on the number of servers included in the server set to randomly obtain a value as the server identifier. The servers included in the server set may be numbered, and the second server may be randomly determined from the servers according to the randomly obtained value. In this way, load balancing in distributed scenarios can be effectively achieved, and multiple load balancing policies are supported.

The reference scheduling policy may include stateless polling scheduling and stateful scheduling. The stateless polling scheduling refers to determining one second server according to the randomly obtained value and supports retry on failure. When a retry upper limit is not reached, data is transmitted to a corresponding server. If the transmission is successful, a scheduling basis list does not need to be updated, and a result indicating successful scheduling is returned. If the transmission is unsuccessful, the scheduling basis list is updated, for example, by incrementing the integer value int converted from the signature of the data to be processed, for example, by 1.

The stateful scheduling means that when data is processed for the first time, one second server is determined according to the randomly obtained value, the scheduling basis list is updated, and a correspondence between the signature of the data to be processed and the selected second server is recorded. Subsequently when data is processed, if the retry upper limit is not reached, the scheduling basis list is queried and the data is transmitted to the corresponding server. If the retry limit is already reached but the transmission still fails, a scheduling error message is returned to the user for processing by the user.

409. Transmit the intermediate processing result to the second server, so that the second server invokes a second worker node to execute a processing operation corresponding to the next service process on the intermediate processing result, the second worker node being a worker node on the second server for processing the next service process.

Figure 8:
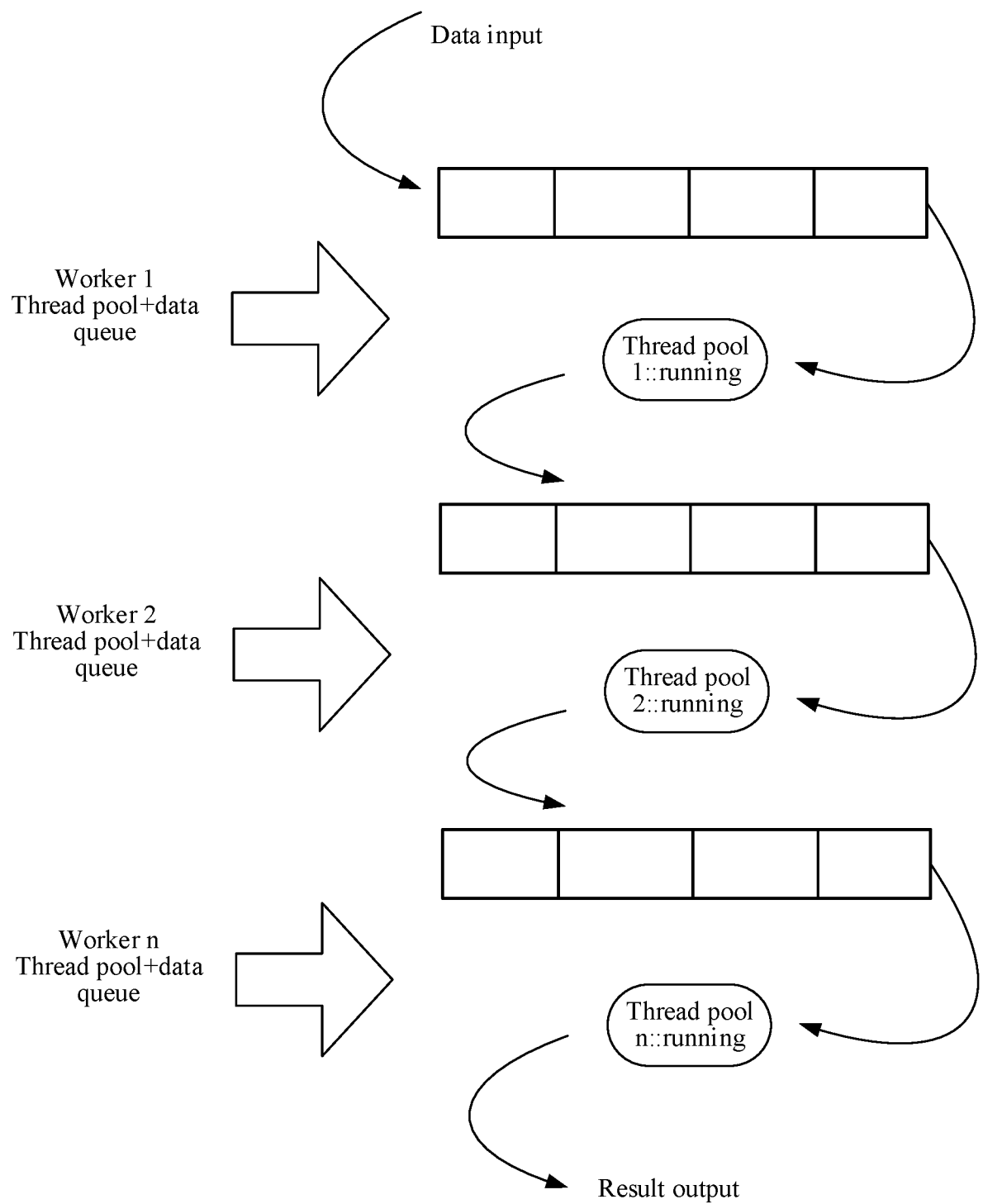
FIG. 8 is a schematic diagram of a single service processing process according to an embodiment of this application.

In some embodiments, as shown in FIG. 8, in work nodes (worker 1, worker 2, worker n) for processing a service process of a service, each worker performs processing corresponding to the service process on the data in its thread pool and transmits a processing result to a next worker, so as to efficiently implement the service processes of the service to obtain a final processing result.

In some embodiments of this application, worker nodes (workers) for processing the service processes of the service may be flexibly configured on the server(s), and workers can be freely combined. Free combination means that worker nodes on different servers may be freely selected to jointly realize a specified service. The combination order of the workers, i.e., the order in which the worker nodes execute operations, may be specified. Multiple working modes may be set for the same service. The working mode can be flexibly switched. In this way, specific service processes can be highly customized, thereby facilitating the adaption of the system to new service scenarios and achieving high scalability. In addition, the dependence on complicated components and running environment can be avoided, and the requirements of efficient processing of real-time data streams in various service scenarios can be fully met.

Figure 9:
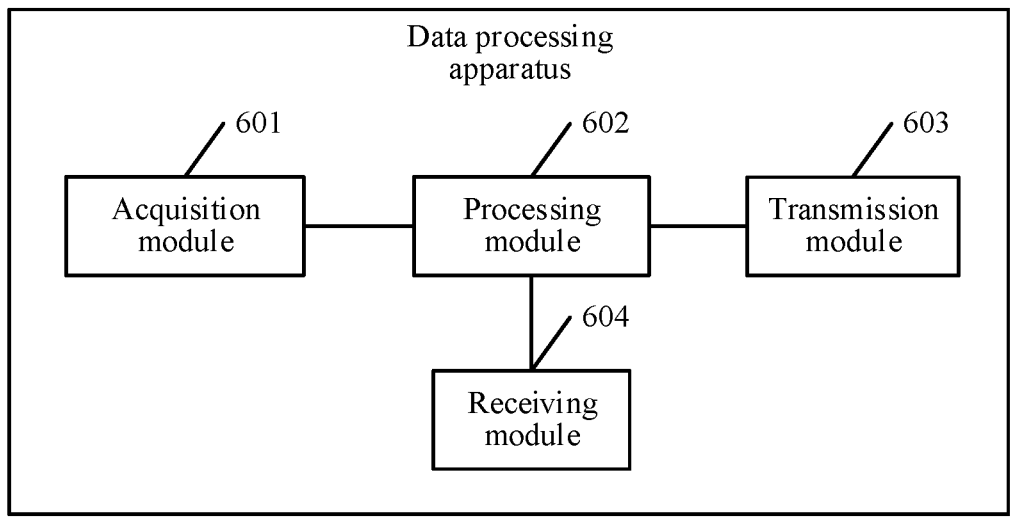
FIG. 9 is a schematic structural diagram of a data processing apparatus according to an embodiment of this application.

FIG. 9 is a schematic structural diagram of a data processing apparatus according to an embodiment of this application. The apparatus includes:

an acquisition module 601, configured to acquire a data processing request of a target service, the data processing request carrying data to be processed, the data to be processed including streaming signal data generated in real time;

a processing module 602, configured to invoke a first worker node of the first server to execute a processing operation corresponding to a first service process of the target service on the data to be processed to obtain an intermediate processing result, the first worker node being a worker node on the first server for processing the first service process; and a transmission module 603, configured to transmit the intermediate processing result to a second server of the plurality of servers according to a next service process of the first service process in a plurality of service processes included in the target service, so that the second server invokes a second worker node to execute a processing operation corresponding to the next service process on the intermediate processing result, the second worker node being a worker node on the second server for processing the next service process.

In some embodiments, each server further has an engine service management component running thereon, and the apparatus further includes a receiving module 604.

The acquisition module 601 is further configured to acquire service configuration data of the first server.

The processing module 602 is further configured to invoke the engine service management component to start one or more worker nodes according to the service configuration data, and configure a service process processed by each worker node, wherein the service process processed by each worker node is one of the plurality of service processes included in the target service.

The transmission module 603 is further configured to invoke the engine service management component to transmit first node registration information of the first server to another server of the plurality of servers.

The receiving module 604 is configured to receive second node registration information transmitted by another server.

In some embodiments, the first node registration information includes the service process processed by each of the worker nodes, a node identifier, and a network address of the first server; and the second node registration information includes a service process processed by each worker node on another server, a node identifier and a network address of another server.

In some embodiments, each server further has a service registry running thereon, and the acquisition module 601 is further configured to invoke the service registry to acquire registration data of each worker node on the first server, wherein the registration data includes the service process processed by each worker node and the node identifier.

The processing module 602 is further configured to generate the first node registration information of the first server according to the registration data of each worker node.

In some embodiments, the acquisition module 601 is further configured to acquire service update data of the first server; and the processing module 602 is further configured to invoke the engine service management component to perform an adjustment operation on the worker node of the first server according to the service update data, the adjustment operation including one or more of the service processes of adding a worker node, deleting a worker node and adjusting a service process processed by the worker node.

In some embodiments, the processing module 602 is further configured to invoke the engine service management component to start at least one third worker node according to the service configuration data, in response to a number of the data processing requests acquired within a reference time reaching a number threshold; and configure a service process processed by each third worker node.

In some embodiments, the processing module 602 is further configured to:

determine characteristic data of a thread pool of each worker node according to the service configuration data, wherein the characteristic data includes a number of work threads and a number of resources occupied; and invoke the engine service management component to start the thread pool on each worker node according to the characteristic data of the thread pool of each worker node, a work thread included in the thread pool being used for processing a corresponding service process.

In some embodiments, the transmission module 603 is configured to:

acquire the next service process of the first service process in the plurality of service processes included in the target service;

acquire a server set composed of servers where the worker node used to process the next service process is located from the plurality of servers; and determine the second server from the servers included in the server set according to a reference scheduling policy, and transmitting the intermediate processing result to the second server.

In some embodiments, the transmission module 603 is configured to:

acquire a current working mode of the target service;

acquire a plurality of service processes included in the current working mode and an execution order of the plurality of service processes; and acquire the next service process of the first service process according to the plurality of service processes included in the current working mode and the execution order of the plurality of service processes.

In some embodiments, the transmission module 603 is configured to:

determine a server identifier according to a signature of the data to be processed and a number of servers included in the server set; and acquire the second server corresponding to the server identifier from the servers included in the server set.

In some embodiments, the acquisition module 601 is further configured to acquire a mode switching instruction of the target service, the mode switching instruction carrying a target working mode.

The processing module 602 is further configured to switch the current working mode of the target service to the target working mode.

The acquisition module 601 is further configured to acquire a plurality of service processes included in the target working mode and an execution order of the plurality of service processes.

In some embodiments, the acquisition module 601 is further configured to acquire working mode configuration data of the target service.

The processing module 602 is further configured to generate one or more working modes of the target service according to the working mode configuration data, each working mode including a plurality of service processes and an execution order of the plurality of service processes.

In some embodiments, a thread pool running on the first worker node includes a plurality of work threads, and the processing module 602 is configured to:

invoke the plurality of work threads of the first worker node to perform the processing operation corresponding to the first service process of the target service in parallel on the data to be processed to obtain the intermediate processing result.

It may be understood that, functions of functional modules of the data processing apparatus in the embodiments of this application may be implemented according to the methods in the foregoing method embodiments; for implementation processes, reference may be made to related descriptions for the foregoing method embodiments, and the details will not be described herein again.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 10:
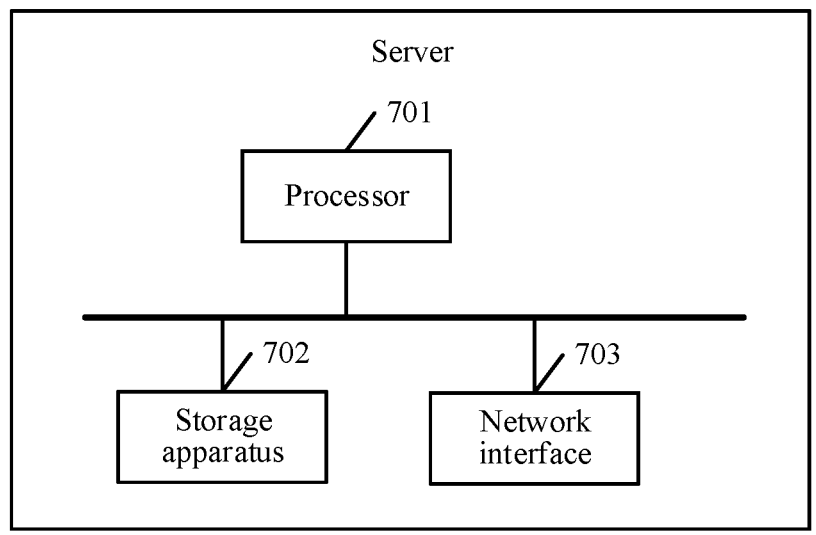
FIG. 10 is a schematic structural diagram of a server according to an embodiment of this application.

FIG. 10 is a schematic structural diagram of a server according to an embodiment of this application. The server of this embodiment of this application includes a power supply module and other structures, and includes a processor 701, a storage apparatus 702, and a network interface 703. The processor 701, the storage apparatus 702, and the network interface 703 may exchange data.

The storage apparatus 702 may include a volatile memory, for example, a random access memory (RAM). The storage apparatus 702 may alternatively include a non-volatile memory, for example, a flash memory, or a solid-state drive (SSD). The storage apparatus 702 may alternatively include a combination of the foregoing types of memories.

The processor 701 may be a central processing unit (CPU) 701. In an embodiment, the processor 701 may alternatively be a graphics processing unit (GPU) 801. The processor 701 may alternatively be a combination of a CPU and a GPU. In an embodiment, the storage apparatus 702 is configured to store program instructions. The processor 701 may invoke the program instructions to execute the following operation:

acquiring a data processing request of a target service, the data processing request carrying data to be processed, the data to be processed including streaming signal data generated in real time;

invoking a first worker node of the first server to execute a processing operation corresponding to a first service process of the target service on the data to be processed to obtain an intermediate processing result, the first worker node being a worker node on the first server for processing the first service process; and transmitting the intermediate processing result to a second server of the plurality of servers according to a next service process of the first service process in a plurality of service processes included in the target service, so that the second server invokes a second worker node to execute a processing operation corresponding to the next service process on the intermediate processing result, the second worker node being a worker node on the second server for processing the next service process.

In some embodiments, each server further has an engine service management component running thereon, and the processor 701 is further configured to:

acquire service configuration data of the first server;

invoke the engine service management component to start one or more worker nodes according to the service configuration data, and configure a service process processed by each worker node, wherein the service process processed by each worker node is one of the plurality of service processes included in the target service;

invoke the engine service management component to transmit first node registration information of the first server to another server of the plurality of servers; and receive second node registration information transmitted by another server.

In some embodiments, the first node registration information includes the service process processed by each of the worker nodes, a node identifier, and a network address of the first server; and the second node registration information includes a service process processed by each worker node on another server, a node identifier and a network address of another server.

In some embodiments, each server further has a service registry running thereon, and the processor 701 is further configured to invoke the service registry to acquire registration data of each worker node on the first server, wherein the registration data includes the service process processed by each worker node and the node identifier; and generate the first node registration information of the first server according to the registration data of each worker node.

In some embodiments, the processor 701 is further configured to:

acquire service update data of the first server; and invoke the engine service management component to perform an adjustment operation on the worker node of the first server according to the service update data, the adjustment operation including one or more of the service processes of adding a worker node, deleting a worker node and adjusting a service process processed by the worker node.

In some embodiments, the processor 701 is further configured to:

invoke the engine service management component to start at least one third worker node according to the service configuration data, in response to a number of the data processing requests acquired within a reference time reaching a number threshold; and configure a service process processed by each third worker node.

In some embodiments, the processor 701 is further configured to:

determine characteristic data of a thread pool of each worker node according to the service configuration data, wherein the characteristic data includes a number of work threads and a number of resources occupied; and invoke the engine service management component to start the thread pool on each worker node according to the characteristic data of the thread pool of each worker node, a work thread included in the thread pool being used for processing a corresponding service process.

In some embodiments, the processor 701 is configured to:

acquire the next service process of the first service process in the plurality of service processes included in the target service;

acquire a server set composed of servers where the worker node used to process the next service process is located from the plurality of servers; and determine the second server from the servers included in the server set according to a reference scheduling policy, and transmitting the intermediate processing result to the second server.

In some embodiments, the processor 701 is configured to:

acquire a current working mode of the target service;

acquire a plurality of service processes included in the current working mode and an execution order of the plurality of service processes; and acquire the next service process of the first service process according to the plurality of service processes included in the current working mode and the execution order of the plurality of service processes.

In some embodiments, the processor 701 is configured to:

determine a server identifier according to a signature of the data to be processed and a number of servers included in the server set; and acquire the second server corresponding to the server identifier from the servers included in the server set.

In some embodiments, the processor 701 is further configured to:

acquire a mode switching instruction of the target service, the mode switching instruction carrying a target working mode;

switch the current working mode of the target service to the target working mode; and acquire a plurality of service processes included in the target working mode and an execution order of the plurality of service processes.

In some embodiments, the processor 701 is further configured to: acquire working mode configuration data of the target service; and generate one or more working modes of the target service according to the working mode configuration data, each working mode including a plurality of service processes and an execution order of the plurality of service processes.

In some embodiments, a thread pool running on the first worker node includes a plurality of work threads, and the processor 701 is configured to:

invoke the plurality of work threads of the first worker node to perform the processing operation corresponding to the first service process of the target service in parallel on the data to be processed to obtain the intermediate processing result.

The processor 701, the storage apparatus 702, and the network interface 703 described in the embodiments of this application can execute the implementations described in the related embodiments of the data processing method provided in FIG. 3 or FIG. 4 of the embodiments of this application, and can also execute the implementations described in the related embodiments of the data processing apparatus provided in FIG. 9 in the embodiments of this application, and the details will not be described herein again.

A person of ordinary skill in the art may understand that all or some of the processes of the methods in the embodiments may be implemented by using a computer program instructing relevant hardware. The program includes one or more instructions and may be stored in a computer-readable storage medium. When the program runs, the processes of the methods in the embodiments are performed. The foregoing storage medium may be a magnetic disk, an optical disc, a read-only memory (ROM), a random access memory (RAM), or the like.

The embodiments of this application further provide a computer program product or a computer program, the computer program product or the computer program including computer instructions, the computer instructions being stored in a computer-readable storage medium. A processor of a computer device reads the computer instructions from the computer-readable storage medium and executes the computer instructions, to cause the computer device to perform the steps of the method embodiments described above.

What is disclosed above is merely some embodiments of this application, and certainly is not intended to limit the scope of the claims of this application. Therefore, equivalent variations made in accordance with the claims of this application shall fall within the scope of this application.

What is claimed is:

1. A data processing method, applied to a first server of a plurality of servers in a service processing system, each server including one or more worker nodes and an engine service management component, the method comprising:
   invoking the engine service management component to start one or more worker nodes according to service configuration data of the first server, and configuring one or more service processes to be processed by the one or more worker nodes on the first server, wherein the one or more service processes includes a first service process of a plurality of service processes in a target service;
   invoking the engine service management component to transmit first node registration information of the first server to another server of the plurality of servers;
   receiving second node registration information transmitted by the another server;
   acquiring a data processing request of the target service, the data processing request including data to be processed;
   invoking a first worker node of the first server to execute an operation corresponding to the first service process of the target service on the data to be processed to obtain an intermediate processing result, the first worker node being a worker node on the first server for processing the first service process; and
   transmitting the intermediate processing result to a second server of the plurality of servers according to a next service process in the plurality of service processes in the target service and the second node registration information, so that the second server invokes a second worker node to execute an operation corresponding to the next service process on the intermediate processing result, the second worker node being a worker node on the second server for processing the next service process.

2. The method of claim 1, wherein the first node registration information comprises the service process processed by each of the worker nodes, a node identifier, and a network address of the first server; and the second node registration information comprises a service process processed by each worker node on the another server, a node identifier and a network address of the another server.

3. The method of claim 1, wherein each server further includes a service registry, and the method further comprises:
   invoking the service registry to acquire registration data of each worker node on the first server, wherein the registration data comprises the service process processed by each worker node and the node identifier; and
   generating the first node registration information of the first server according to the registration data of each worker node.

4. The method of claim 1, wherein the method further comprises:
   acquiring service update data of the first server; and
   invoking the engine service management component to perform an adjustment operation on the worker node of the first server according to the service update data, the adjustment operation comprising one or more of the service processes of adding a worker node, deleting a worker node and adjusting a service process processed by the worker node.

5. The method of claim 1, wherein the method further comprises:
   invoking the engine service management component to start at least one third worker node according to the service configuration data, in response to a number of the data processing requests acquired within a reference time reaching a number threshold; and
   configuring a service process processed by each third worker node.

6. The method of claim 1, wherein the method further comprises:
   determining characteristic data of a thread pool of each worker node according to the service configuration data, wherein the characteristic data comprises a number of work threads and a number of resources occupied; and
   invoking the engine service management component to start the thread pool on each worker node according to the characteristic data of the thread pool of each worker node, a work thread in the thread pool being used for processing a corresponding service process.

7. The method of claim 1, wherein the transmitting the intermediate processing result to a second server of the plurality of servers according to a next service process of the first service process in a plurality of service processes in the target service comprises:
   acquiring the next service process of the first service process in the plurality of service processes in the target service;
   acquiring a server set composed of servers where the worker node used to process the next service process is located from the plurality of servers; and
   determining the second server from the servers in the server set according to a reference scheduling policy, and transmitting the intermediate processing result to the second server.

8. The method of claim 7, wherein the acquiring the next service process of the first service process in the plurality of service processes in the target service comprises:
   acquiring a current working mode of the target service;

acquiring a plurality of service processes in the current working mode and an execution order of the plurality of service processes; and acquiring the next service process of the first service process according to the plurality of service processes in the current working mode and the execution order of the plurality of service processes.

9. The method of claim 7, wherein the determining the second server from the servers in the server set according to a reference scheduling policy comprises:

determining a server identifier according to a signature of the data to be processed and a number of servers in the server set; and acquiring the second server corresponding to the server identifier from the servers in the server set.

10. The method of claim 7, wherein the method further comprises:

acquiring a mode switching instruction of the target service, the mode switching instruction including a target working mode;

switching the current working mode of the target service to the target working mode; and acquiring a plurality of service processes in the target working mode and an execution order of the plurality of service processes.

11. The method of claim 7, wherein the method further comprises:

acquiring working mode configuration data of the target service; and generating one or more working modes of the target service according to the working mode configuration data, each working mode comprising a plurality of service processes and an execution order of the plurality of service processes.

12. The method of claim 1, wherein a thread pool running on the first worker node comprises a plurality of work threads, and the invoking a first worker node of the first server to execute an operation corresponding to a first service process of the target service on the data to be processed to obtain an intermediate processing result comprises:

invoking the plurality of work threads of the first worker node to perform the operation corresponding to the first service process of the target service in parallel on the data to be processed to obtain the intermediate processing result.

13. A non-transitory computer-readable storage medium, storing a computer program, the computer program comprising program instructions, the program instructions being executable by at least processor of a first server to perform:

invoking an engine service management component of the first server to start one or more worker nodes according to service configuration data of the first server, and configuring one or more service processes to be processed by the one or more worker nodes on the first server, wherein the one or more service processes includes a first service process of a plurality of service processes in a target service, and the first server belongs to of a plurality of servers in a service processing system;

invoking the engine service management component to transmit first node registration information of the first server to another server of the plurality of servers;

receiving second node registration information transmitted by the another server;

acquiring a data processing request of the target service, the data processing request including data to be processed;

invoking a first worker node of the first server to execute an operation corresponding to the first service process of the target service on the data to be processed to obtain an intermediate processing result, the first worker node being a worker node on the first server for processing the first service process; and transmitting the intermediate processing result to a second server of the plurality of servers according to a next service process in the plurality of service processes in the target service and the second node registration information, so that the second server invokes a second worker node to execute an operation corresponding to the next service process on the intermediate processing result, the second worker node being a worker node on the second server for processing the next service process.

14. The computer-readable storage medium of claim 13, wherein the first node registration information comprises the service process processed by each of the worker nodes, a node identifier, and a network address of the first server; and the second node registration information comprises a service process processed by each worker node on the another server, a node identifier and a network address of the another server.

15. The computer-readable storage medium of claim 13, wherein each server further includes a service registry, and the program instructions further cause the at least one processor to perform:

invoking the service registry to acquire registration data of each worker node on the first server, wherein the registration data comprises the service process processed by each worker node and the node identifier; and generating the first node registration information of the first server according to the registration data of each worker node.

16. The computer-readable storage medium of claim 13, wherein the program instructions further cause the at least one processor to perform:

acquiring service update data of the first server; and invoking the engine service management component to perform an adjustment operation on the worker node of the first server according to the service update data, the adjustment operation comprising one or more of the service processes of adding a worker node, deleting a worker node and adjusting a service process processed by the worker node.

17. The computer-readable storage medium of claim 13, wherein the program instructions further cause the at least one processor to perform:

invoking the engine service management component to start at least one third worker node according to the service configuration data, in response to a number of the data processing requests acquired within a reference time reaching a number threshold; and configuring a service process processed by each third worker node.

18. A first server, comprising at least one processor, and at least one memory coupled to the at least one processor, the at least one memory being configured to store a computer program, the computer program comprising program instructions, and the at least one processor being configured to call the program instructions to perform:

invoking an engine service management component of the first server to start one or more worker nodes according to service configuration data of the first server, and configuring one or more service processes to be processed by the one or more worker nodes on the first server, wherein the one or more service processes includes a first service process of a plurality of service processes in a target service, and the first server belongs to of a plurality of servers in a service processing system;

invoking the engine service management component to transmit first node registration information of the first server to another server of the plurality of servers;

receiving second node registration information transmitted by the another server;

acquiring a data processing request of the target service, the data processing request including data to be processed;

invoking a first worker node of the first server to execute an operation corresponding to the first service process of the target service on the data to be processed to obtain an intermediate processing result, the first worker node being a worker node on the first server for processing the first service process; and transmitting the intermediate processing result to a second server of the plurality of servers according to a next service process in the plurality of service processes in the target service and the second node registration information, so that the second server invokes a second worker node to execute an operation corresponding to the next service process on the intermediate processing result, the second worker node being a worker node on the second server for processing the next service process.

\* \* \* \* \*